Nov. 7, 1944.                 C. M. DOEDE                  2,362,363
                         SEALING RING OR THE LIKE
                          Filed March 11, 1943

Inventor
Clinton M. Doede,
By Rockwell & Bartholow
Attorneys

Patented Nov. 7, 1944

2,362,363

UNITED STATES PATENT OFFICE 2,362,363

SEALING RING OR THE LIKE

Clinton M. Doede, Hamden, Conn., assignor to The Connecticut Hard Rubber Company, New Haven, Conn., a corporation of Connecticut Application March 11, 1943, Serial No. 478,762

1 Claim. (Cl. 288—3)

This invention relates to sealing rings or the like to be used for example on rotating shafts for preventing the escape of oil or grease about the shaft, and also for excluding extraneous matter from bearings.

In the construction of such rings it is desirable to employ a compressible material such as natural or synthetic rubber for example, so that upon compression this material may be forced into close engagement with the shaft and thus make an effective seal. If the ring is made of metal alone, it would have to fit very tightly upon the shaft in order to form an effective seal. It is also desirable in the construction of such rings to employ a self-lubricating material such as graphite for example, so that the shaft may be operated without the necessity of lubrication.

Also, it is desirable that the ring be substantially rigid so that rubber alone is not satisfactory and it has been found, therefore, advantageous to place the rubber portion of the ring between two rigid or backing portions. One of these backing portions, according to the present invention, will preferably be graphite while the other may be a second ring of graphite or of a metallic substance. The rings of these substances will give sufficient backing or rigidity to the article as a whole so that a rubber ring may be employed between them and when the bearing is put in place under the usual pressure the rubber portion of the ring will be compressed and thereby displaced to some extent to fit closely about the shaft.

The manufacture of such a ring, however, entails the difficulty of securing the rubber ring to the graphite ring. Rubber may be readily bonded by vulcanization to metal, particularly to non-corrosive metal such as brass or copper but it cannot be so bonded to graphite. In the present instance this difficulty has been overcome, however, by plating the surface of the graphite ring to which the rubber is bonded with a coating of metal such as brass, for example. This coating process may be effected in any of the usual and well-known methods used for this purpose, such as electro-depositing.

One object of the present invention is the provision of a unitary sealing ring for shafts or the like, the ring comprising two outer relatively rigid portions and an intermediate ring portion of a compressible material.

A further object of the invention is the provision of a sealing ring of the character set forth above wherein one of the portions is composed of graphite and is bonded to the adjacent surface of the compressible ring portion.

A still further object of the invention is the provision of a sealing ring having a compressible portion of natural or synthetic rubber or similar substance and a portion of graphite, the latter being bonded to the rubber ring portion.

A still further object of the invention is to effect a novel method of securing a ring of compressible material such as natural or synthetic rubber to a ring of graphite, for example, by first plating the bonding surface of the graphite ring with a coat of metal and then bonding the rubber ring thereto by vulcanization.

To these and other ends the invention consists in the novel features and combinations of parts to be hereinafter described and claimed.

Figure 1:
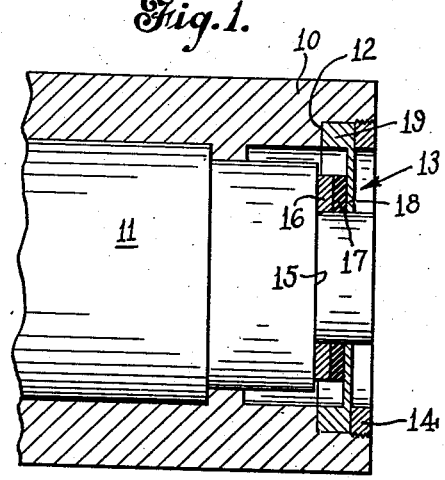
Fig. 1 is a sectional view of a shaft bearing having a sealing ring embodying my improvement.

To illustrate a preferred embodiment of my invention, I have shown in Fig. 1 of the drawing a shaft housing or bearing 10, within which is rotatably mounted a shaft 11, the bearing being provided with a shoulder 12, against which may seat my improved sealing ring designated as a whole by the numeral 13. The sealing ring may be secured in place in any suitable manner such, for example, as by a gland nut 14 which forces the ring against the shoulder 12 and also against a shoulder 15 near the end of the shaft 11.

Figure 2:
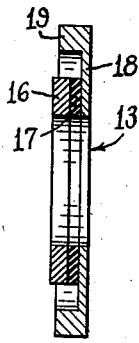
Fig. 2 is a sectional view of the unitary sealing ring alone.
Figure 3:
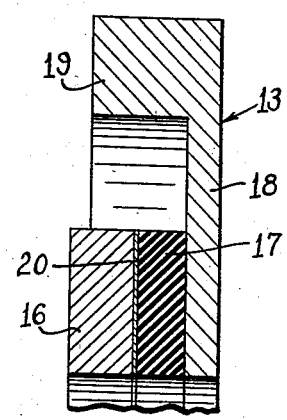
Fig. 3 is an enlarged sectional view of a portion of the sealing ring showing the various constituent parts.

As shown in Figs. 2 and 3, my improved sealing ring consists of three annular or ring portions. One of these portions, 16, is preferably formed of graphite or some graphitic material so as to be self-lubricating. The intermediate ring portion 17 is formed of compressible material such as natural or synthetic rubber, and it will be understood that where the term "rubber" is employed in the present specification and claims it may refer to either natural rubber or synthetic rubber. The outer ring 18 as shown herein is of metal and will preferably be a non-corrosive metal such as leaded bronze, for example, but it will be understood that other metal may be employed.

As shown, the ring 18 is provided with an annular flange 19, which, as shown in Fig. 1, may seat against the shoulder 12.

It is of course desirable to have the parts of the sealing ring secured together to form a unitary structure. This may be readily accomplished, so far as the rings 17 and 18 are concerned, by bonding these two ring portions together by vulcanizing the rubber ring to the metallic ring.

As it is not feasible to bond the rubber ring portion directly to the graphite ring portion 16, other means must be employed for securing these rings together. As a convenient and simple method of bonding these portions of the sealing ring, I first coat or plate the ring portion 16 with a coating of metal as shown at 20. This metal may conveniently be brass as the rubber ring will bond readily to that material. It will be apparent that the resulting article is a unitary device comprising three annular or ring portions, all of which are bonded together so that there will be no danger of separation in ordinary wear, and that the sealing ring consists of an intermeidate compressible annular or ring portion between outer, relatively rigid, ring portions, one of which will preferably be graphite.

It will also be understood that the outer ring 18 may be a second ring of graphite, if desired. In such case, the surface of this ring adjacent that of the intermediate rubber ring will also be metal coated and then bonded to the rubber ring.

Figure 4:
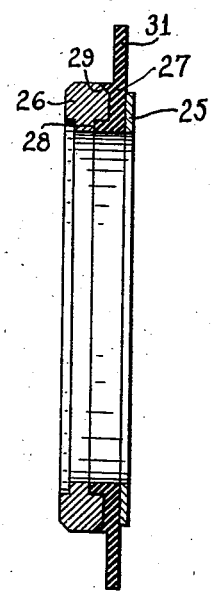
Fig. 4 is a sectional view of a sealing ring of somewhat modified form.
Figure 5:
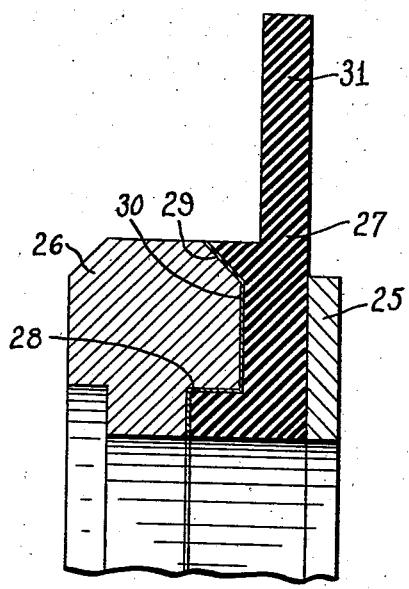
Fig. 5 is an enlarged sectional view of a portion of the sealing ring shown in Fig. 4.

In Figs. 4 and 5 of the drawing I have shown a somewhat modified form of sealing ring in which the outer annular portion 25 is of metal as above, the inner portion 26 of graphite, and the intermediate portion 27 of a compressible material such as natural or synthetic rubber. In this case the outer ring 25 is a plain metal annulus which may be bonded as by vulcanization directly to the ring portion 27.

As will be seen from Fig. 5, the cross-sectional shape of the graphite ring 26 is such as to present a recess or rabbet 28 and an inclined edge portion 29 on the side adjacent the rubber portion 27. It will be understood that this entire side of the ring 26 is coated with metal such as brass or other suitable material, as shown at 30, so that it may be bonded successfully to the rubber ring 27. During the bonding process, the rubber of the ring 27 flows into the rabbet 28 and also along the inclined edge portion 29 so as to form a secure bond between these two parts. As shown, the rubber ring portion 27 is extended beyond the other parts of the seal to provide a clamping flange 31. It may also be noted that the inside diameter of all of the ring portions is substantially equal.

While I have shown and described some preferred embodiments of my invention, it will be understood that it is not to be limited to all of the details shown but is capable of modification and variation within the spirit of the invention and within the scope of the appended claim.

What I claim is:

A unitary sealing ring for shafts comprising a deformable rubber ring portion, a relatively rigid ring portion bonded to one face of the first-named portion and a graphite ring portion bonded by vulcanization to the opposite face of said first-named portion, the face of said graphite portion which is bonded to said rubber ring portion having a metallic coating thereon, said ring portions having registering openings therethrough, and the diameter of the opening in said rubber ring portion being no greater than that of the other ring portions whereby pressure upon the outer ring portion expands said rubber portion inwardly beyond the outer portions to provide a seal against the shaft.

CLINTON M. DOEDE.